(12) United States Patent
Iwamoto

(10) Patent No.: US 6,334,941 B1
(45) Date of Patent: *Jan. 1, 2002

(54) APPARATUS FOR PRODUCING DEIONIZED WATER

(75) Inventor: Junjiro Iwamoto, Yokohama (JP)

(73) Assignee: Asahi Glass Company Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/057,450

(22) Filed: Apr. 9, 1998

(30) Foreign Application Priority Data

Apr. 10, 1997 (JP) .............................. 9-092477

(51) Int. Cl.[7] .............................. B01D 61/48
(52) U.S. Cl. .................. 204/632; 204/634; 210/243; 210/259
(58) Field of Search ................ 204/524, 634, 204/632; 210/257.2, 259, 266, 900, 243

(56) References Cited

U.S. PATENT DOCUMENTS 2,815,320 A * 12/1957 Kollsman .................... 204/634
5,759,373 A * 6/1998 Terada et al. ................ 204/524

FOREIGN PATENT DOCUMENTS

| EP | 0 503 651 | 9/1992 |
| WO | WO 96/22162 | 7/1996 |
| WO | WO 97/25147 | 7/1997 |
| WO | WO 97/34696 | 9/1997 |

OTHER PUBLICATIONS

Patent Abstracts of Japan, vol. 18, No. 337 (C–1217), Jun. 27, 1994, and Derwent Abstract, AN 94–131450, JP 6–079268, Mar. 22, 1994.

Patent Abstracts of Japan, vol. 18, No. 61 (C–1160), Feb. 2, 1994, and Derwent Abstract, AN 93–373712, JP 5–277344, Oct. 26, 1993.

Patent Abstracts of Japan, vol. 16, No. 277 (C–0954), Jun. 22, 1992, and Derwent Abstract, AN 92–128280, JP 4–071624, Mar. 6, 1992.

* cited by examiner

*Primary Examiner*—Ivars Cintins
(74) *Attorney, Agent, or Firm*—Oblon, Spivak, McClelland, Maier & Neustadt, P.C.

(57) ABSTRACT

An apparatus for producing deionized water, which has an ion exchanger accommodated in demineralizing compartments of an electrodialyzer having cation exchange membranes and anion exchange membranes alternately arranged between an anode and a cathode, wherein the ion exchanger is a composite ion exchanger comprising a first porous ion exchanger having a mixture of 60 to 95 wt % of cation exchange resin particles and 5 to 40 wt % of anion exchange resin particles bonded to each other and a second porous ion exchanger having a mixture of 60 to 95 wt % of anion exchange resin particles and 5 to 40 wt % of cation exchange resin particles bonded to each other.

10 Claims, 1 Drawing Sheet

APPARATUS FOR PRODUCING DEIONIZED WATER

BACKGROUND OF THE INVENTION

Field of the Invention present invention relates to an apparatus for producing deionized water.

DESCRIPTION OF THE BACKGROUND

Heretofore, as a method for producing deionized water, it is common to obtain deionized water by passing water to be treated through a bed packed with an ion exchange resin so that impurity ions are removed as adsorbed on the ion exchange resin. Here, it is common to employ a method of regenerating the ion exchange resin having its ion-exchanging and adsorbing abilities lowered, by means of an acid or alkali. However, this method has problems that a troublesome operation is required and that a waste liquid of the acid or alkali used for the regeneration, is discharged. Therefore, a method for producing deionized water which requires no such regeneration, is desired.

From such a viewpoint, a self-regenerating type electrodialysis deionizing method using a combination of an ion exchange resin and an ion exchange membrane has been recently noted. This method employs an electrodialyzer having anion exchange membranes and cation exchange membranes alternately arranged to form demineralizing compartments and having an ion exchanger accommodated in the demineralizing compartments, and is designed to apply a voltage while supplying water to be treated to the demineralizing compartments to carry out electrodialysis to produce deionized water, while regenerating the ion exchanger accommodated in the demineralizing compartments.

With regard to this method, there have been proposed a method of limiting a width and a thickness of a demineralizing compartment (JP-A-61-107906), a method of using ion exchange resin particles having a uniform particle size to be packed in a demineralizing compartment (JP-A-3-207487), a method of using an anion exchange resin as an ion exchange resin to be packed in a part where water to be treated is initially passed (JP-A-4-71624), a method of using a mixture of an ion exchange resin and an ion exchange fiber as an ion exchanger to be packed in a demineralizing compartment (JP-A-5-277344), and the like.

However, a purity of deionized water was not stable due to such problems that ion exchangers having the same ionic charges were aggregated each other, that ion exchange resin particles or fibers were damaged by a water stream and that efficient demineralization and regeneration could not be conducted.

In order to solve the above mentioned problems, there have been proposed a method of introducing ion exchange groups into a non-woven cloth such as polyethylene or polypropylene by graft-formation by radiation (JP-A-5-64726, JP-A-5-131120), a method of forming a sheet-like material after making a composite fibrous form of a spot-like structure of an ion exchange polymer and a reinforcing polymer (JP-A-6-79268), and the like.

According to these methods, an ion exchanger is fixed, but these methods have various defects that it is necessary to use radiation, that a step of making composite fibers is complicated, and that a mechanical strength is not always satisfactory.

SUMMARY OF THE INVENTION

Thus, an object of the present invention is to stably produce deionized water having a high purity at a low voltage by a self-regenerating type electrodialysis deionization method using a combination of an ion exchange membrane and an ion exchanger fixed without a complicated step of using radiation.

BRIEF DESCRIPTION OF THE DRAWING

The drawing illustrates the porous ion-exchanger of the present invention having a dot-shaped pattern.

DETAILED DESCRIPTION OF THE PREFERRED EMBODIMENTS

Figure 1:
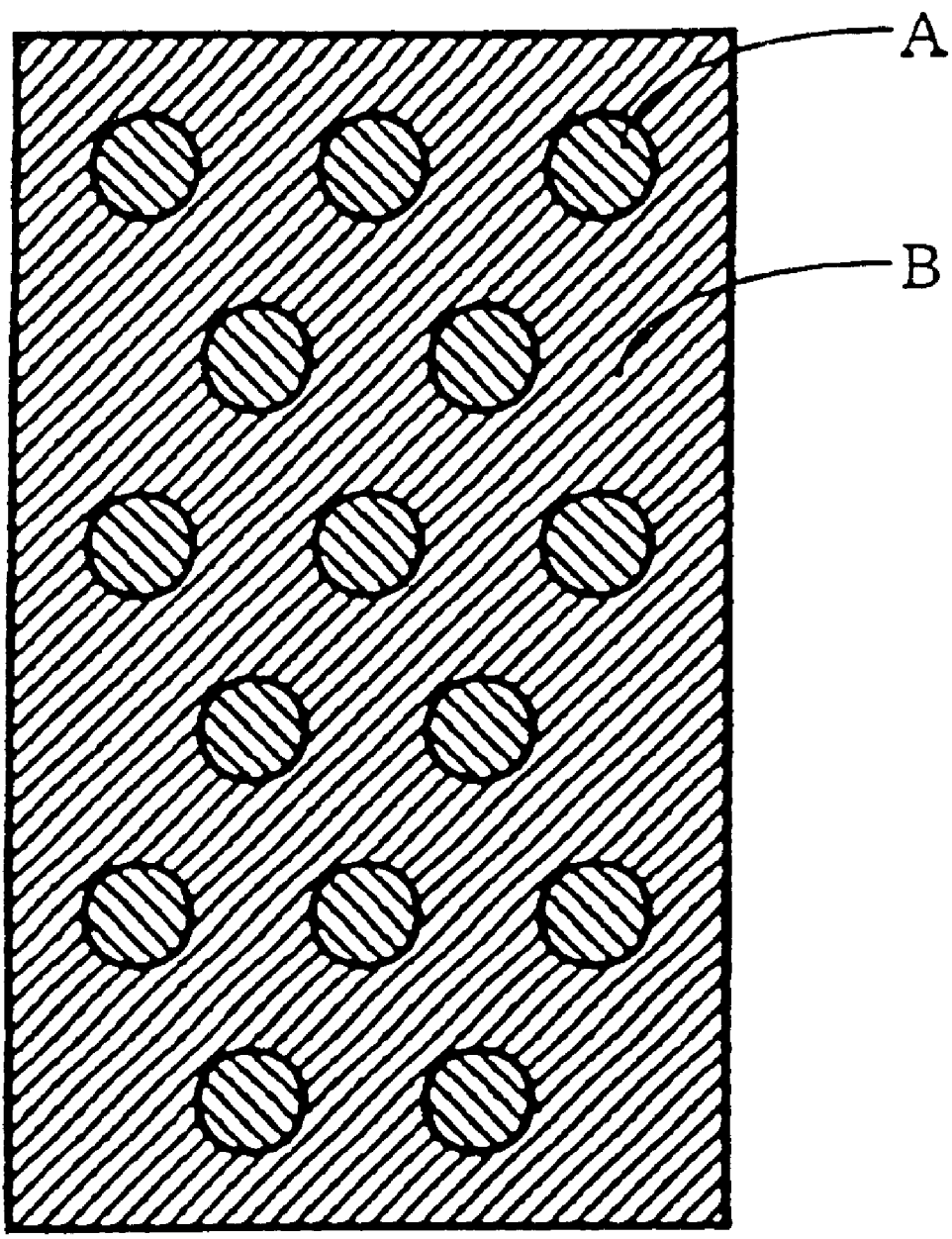

That is, the present invention provides an apparatus for producing deionized water, which has an ion exchanger accommodated in demineralizing compartments of an electrodialyzer having cation exchange membranes and anion exchange membranes alternately arranged between an anode and a cathode, wherein the ion exchanger is a composite ion exchanger comprising a first porous ion exchanger having a mixture of 60 to 95 wt % of cation exchange resin particles and 5 to 40 wt % of anion exchange resin particles bonded to each other and a second porous ion exchanger having a mixture of 60 to 95 wt % of anion exchange resin particles and 5 to 40 wt % of cation exchange resin particles bonded to each other.

Hereinafter, in the present specification, a first porous ion exchanger means an ion exchanger having a mixture of 60 to 95 wt % of cation exchange resin particles and 5 to 40 wt % of anion exchange resin particles bonded to each other, and a second porous ion exchanger means an ion exchanger having a mixture of 60 to 95 wt % of anion exchange resin particles and 5 to 40 wt % of cation exchange resin particles bonded to each other.

In the present invention, an ion exchanger comprises a first porous ion exchanger and a second porous ion exchanger. By using this ion exchanger, a specific amount of electric current can be applied at a low voltage and deionization can be carried out at a high level. Thus, by using the first porous ion exchanger and the second porous ion exchanger of the above mentioned compositions, moving distances of ion components can be shortened and dissociation of water can be fully carried out to achieve satisfactory deionization performances.

In accordance with a voltage gradient, ion components transfer through the same kind of ion exchange particles in contact with each other and move through a demineralizing compartment and permeate through a membrane to reach a concentrating compartment. Thus, in order to make the movement of ion components easy, it is preferable that the same kind of ion exchange resin particles are aligned in the direction of voltage. Like the first porous ion exchanger and the second porous ion exchanger, an ion exchanger, the same kind of ion exchange particles of which are continuously aligned to some degree in the direction of voltage, is preferable since ion components can transfer easily therethrough.

On the other hand, when dissociation of water occurs, protons and hydroxyl ions are generated to fully supply cations and anions without providing a bad influence on water quality, and this is preferable for improving ionization performances. In order to fully cause dissociation of water, it is important to make cation exchange resin particles in contact with anion exchange resin particles. Since the first porous ion exchanger and the second porous ion exchanger have oppositely ionized ion exchange resin particles made in contact with each other in the inside to some extent, dissociation of water can be fully caused.

A composite ion exchanger comprising a first porous ion exchanger and a second porous ion exchanger has a water permeability of at least 1 kg·cm$^{-1}$·h$^{-1}$, particularly at least 10 kg·cm$^{-1}$·h$^{-1}$ under a pressure of 0.35 kg·cm$^{-2}$. If the water permeability is lower than 1 kg·cm$^{-1}$·h$^{-1}$, an amount of water treated is reduced or operation requires an unfavorably high pressure.

The water permeability is determined by preparing a sample of a column-like body (e.g. rectangular or cylindrical column) having two bottom faces arranged in parallel each other, introducing water under a pressure of 0.35 kg·cm$^{-2}$ through one bottom face without leaking water from the side face, and measuring an amount of water flown through the other bottom face. The water permeability is expressed by the formula WL/A (kg·cm$^{-1}$·h$^{-1}$), wherein A (cm$^2$) represents an area of the bottom face, L (cm) represents a height of the column-like body, i.e. distance between the two bottom faces, and W (kg·h$^{-1}$) represents a permeation amount of water per hour. A and L can be optionally determined, but A is preferably in the range of from 1 to 1000 cm$^2$, and L is preferably in the range of from 1 to 100 cm.

Examples of patterns of a combination of a first porous ion exchanger and a second porous ion exchanger include a layered pattern of striped pattern, a pattern of one continues body and the other polka-dotted pattern, a checkerwise pattern, and the like. Also, a binder polymer having no ion exchanging property may be placed between ion exchangers.

In the present invention, the first porous ion exchanger and the second porous ion exchanger can be arranged so as to provide an aimed pattern, but preferably the first porous ion exchanger and the second porous ion exchanger are combined into one body.

In the present invention, it is preferable to prepare a composite ion exchanger in the following manner. First, a first porous ion exchanger comprising ion exchange resin particles and a binder polymer is formed. Secondly, a second porous ion exchanger comprising ion exchange resin particles and a binder polymer is formed. Thereafter, depending on their uses, these ion exchangers are cut into appropriate shapes, and are combined to provide a desired pattern.

Further, examples of a method for fixing an ion exchanger into an electrodialyzer include a method of preparing a composite ion exchanger having a first porous ion exchanger and a second porous ion exchanger formed into one body and then fixing the composite ion exchanger into an electrodialyzer, a method of preparing each of a first porous ion exchanger and a second porous ion exchanger and then forming the two ion exchangers into one body at the time of fixing them into an electrodialyzer, and the like. Ion exchange resin particles constituting the first porous ion exchanger and the second porous ion exchanger have an average particle size of preferably in the range of from 50 to 2000 $\mu$m. If the average particle size is less than 50 $\mu$m, a vacant pore diameter of a porous ion exchanger becomes too small to smoothly flow water through a demineralizing compartment, thereby reducing an amount of treated water. On the other hand, if the average particle size exceeds 2000 $\mu$m, a surface area of the ion exchanger is insufficient, and the efficiency of ion exchange treatment is lowered. Thus, it is more preferable that the ion exchange resin particles have an average particle size of from 300 to 1000 $\mu$m. The ion exchange resin particles are synthesized so as to have an average particle size in the above mentioned range or pulverized so as to provide an average particle size in the above mentioned range.

The ion exchange resin particles may be in various forms of spherical, oval, plate-like, disk-like, or rod-like shapes which can be formed into a porous layer of an aggregate, but a spherical shape is particularly preferable since it provides an excellent water permeability.

The ion exchange resin particles have an ion exchange capacity of preferably from 0.5 to 7.0 meq/g dry resin. If the ion exchange capacity is less than 0.5 meq/g dry resin, adsorption and demineralization of ions can not be satisfactorily carried out in a demineralizing compartment, and a water purity of deionized water is lowered.

On the other hand, if the ion exchange capacity is more than 7.0 meq/g dry resin, a strength of the ion exchange resin particles is unfavorably lowered. More preferably, the ion exchange capacity is in the range of from 1.0 to 5.0 meq/g dry resin, and in such case, deionized water having a high purity can be obtained and performance stability is also excellent. Further, the ion exchange resin particles having an ion exchange capacity in the above mentioned range are widely used for general water treatment, and are easily commercially available at a low price. This is a great industrial merit.

As an ion exchange resin group of the ion exchange resin particles, a strong acid type, e.g. a sulfonic acid type cation exchange group, and a strong base type, e.g. a quaternary ammonium type or pyridinium salt type anion exchange group, are preferable in view of ion exchange property and chemical stability.

The first porous ion exchanger or the second porous ion exchanger is used preferably by binding ion exchange resin particles with an adhesive polymer.

The adhesive polymer is used preferably in a weight amount of from 0.5 to 20 wt %, more preferably from 1 to 10 wt %, on the basis of the weight of the porous ion exchanger.

If the weight amount of the adhesive polymer exceeds 20 wt %, the surface of the ion exchange resin particles is too much coated with the adhesive polymer, and consequently there are provided disadvantages that an adsorptivity of ion components is lowered, that a flow amount of a liquid to be treated is reduced due to the reduction of porosity, and that a pressure loss becomes large. If the weight of the adhesive polymer is less than 0.5 wt %, a strength of the porous body becomes small, and consequently it becomes difficult to handle the product.

As the adhesive polymer, a thermoplastic polymer or a solvent-soluble polymer is preferable in view of a production method of the porous ion exchanger. Further, a polymer having an ion exchange group is more preferable in order to prevent the lowering of a purity of deionized water.

An ion exchange capacity of the adhesive polymer having the ion exchange group is preferably from 0.5 to 5 meq/g dry resin. If the ion exchange capacity is less than 0.5 meq/g dry resin, the demineralization of ions adsorbed by the ion exchange resin is not satisfactorily carried out, and the purity of treated water is liable to be unfavorably lowered. An adhesive polymer having an ion exchange capacity of from 0.8 to 3 meq/g dry resin is particularly preferable since it provides a deionized water having a high purity and an excellent performance stability.

Examples of the thermoplastic polymer include a low density polyethylene, a linear low density polyethylene, a high density polyethylene having an ultrahigh molecular weight, polypropylene, polyisobutylene, vinyl acetate, ethylene-vinyl acetate copolymer, and the like. Also, examples of the solvent-soluble polymer include natural rubber, butyl rubber, polyisoprene, polychloroprene, styrene-butadiene rubber, nitrile rubber, vinyl chloride-aliphatic acid vinyl ester copolymer, and the like.

Further, examples of a polymer having an ion exchange group include a polymer containing polystyrenesulfonic acid, polyvinylsulfonic acid, poly(2-acrylamide-2-methylpropanesulfonic acid), polyacrylic acid, polymethacrylic acid, perfluorosulfonic acid or its salt. Further examples include a polymer containing polyvinyl benzyl trimethylammonium chloride, a polymer containing poly(4-vinylpyridine), poly(2-vinylpyridine), poly(dimethylaminoethylacrylate), poly(1-vinylimidazole), poly(2-vinylpyrazine), poly(4-butenylpyridine), poly(N,N-dimethylacrylamide), poly(N,N-dimethylaminopropylacrylamide), or their quaternary ammonium compounds, and a polymer containing polyethyleneimine, and the like.

Among the above polymers, when using a water-soluble polymer, it is preferable to use an adhesive polymer solution having a crosslinking agent added and subjected to crosslinking treatment.

Preferable examples of a method for preparing a porous ion exchanger by using an adhesive polymer in accordance with the present invention include a method which comprises heat-kneading ion exchange resin particles and an adhesive polymer and then heat-forming the kneaded material into a sheet-like material by a flat plate press or the like, a method which comprises coating ion exchange resin particles with an adhesive polymer solution and evaporating the solvent to cure, a method which comprises heat-mixing and forming an adhesive polymer, a pore-forming agent and ion exchange resin particles and then extracting the pore-forming agent, and a method which comprises coating ion exchange-resin particles with an adhesive polymer solution having a pore-forming agent dispersed, curing and then extracting the pore-forming agent.

Among the above illustrated methods, the method which comprises heat-kneading ion exchange resin particles and an adhesive polymer and then heat-forming the kneaded material into a sheet-like material by a flat plate press and the method which comprises heat-mixing and forming an adhesive polymer, a pore-forming agent and ion exchange resin particles and then extracting the pore-forming agent are particularly preferable in view of formability and specific resistance of the porous ion exchanger thus obtained. The heat-forming temperature of the above adhesive polymer is not particularly limited, but is preferably from 120 to 180° C. in view of heat-resistance of ion exchange resin particles.

Further, when an adhesive polymer solution is used, a concentration is not specially limited, but is preferably from 5 to 50 wt %. Examples of a solvent used include water, and a general organic solvent such as alcohol, ketone, ester, and the like. In the method which comprises coating ion exchange resin particles with an adhesive polymer solution and evaporating the solvent to cure, the adhesive polymer solution may be coated on the ion exchange resin particles placed on a mesh or porous body as a support and then dried, or the ion exchange resin particles may be dipped in the adhesive polymer solution, dried and then heat-pressed.

When using a pore-forming agent, the pore-forming agent is added preferably in an amount of from 5 to 40 wt % to the weight of an adhesive polymer. The kind of the pore-forming agent is not specially limited as long as it can be extracted with a solvent, and a polymer powder of polyvinyl alcohol, polyester or the like is preferable.

The apparatus for producing deionized water of the present invention, has an ion exchanger accommodated in demineralizing compartments of an electrodialyzer having cation exchange membranes and anion exchange membranes alternately arranged between an anode and a cathode.

A preferable embodiment is illustrated below. That is, a preferable apparatus contains plural sheets of cation exchange membranes and anion exchange membranes alternately arranged and from 2 to 300 sets of demineralizing compartments and concentrating compartments alternately arranged in series between an anode compartment provided with an anode and a cathode compartment provided with a cathode, each of the demineralizing compartments being compartmentalized with an anion exchange membrane on the anode side and compartmentalized with a cation exchange membrane on the cathode side and each of the concentrating compartments being compartmentalized with a cation exchange membrane on the anode side and compartmentalized with an anion exchange membrane on the cathode side. Demineralization is carried out by applying an electric current, while passing water to be treated through the demineralizing compartments and passing water through the concentrating compartments to exclude concentrated salts.

It is preferable to apply a few volts of voltage to each unit cell to cause dissociation of water in demineralizing compartments.

An ion exchanger is preferably accommodated in demineralizing compartments under a pressure of from 0.1 to 20 kg·cm$^{-2}$, particularly from 0.5 to 10 kg·cm$^2$. If a pressure difference to the atmospheric pressure is less than 0.1 kg·cm$^{-2}$, a short pass is liable to be formed in a gap between the ion exchanger and a membrane, and impurity ions in water to be treated are hardly adsorbed on the ion exchange resin, and a deionized water having a high purity can not be obtained. On the other hand, if the pressure difference to the atmospheric pressure exceeds 20 kg·cm$^{-2}$, a wall of an electrodialyzer and an ion exchange membrane are liable to be damaged.

Examples of a method for accommodating an ion exchanger in demineralizing compartments under a pressurized state include a method which comprises packing an ion exchanger in a closed space and swelling the ion exchanger, a method which comprises packing an ion exchanger in a closed space and reducing a volume of the closed space, a method which comprises packing an ion exchanger together with other packing materials in a closed space and swelling the packed materials.

More complete examples of the above methods include a method which comprises packing a dry resin and then swelling with water, a method which comprises packing an addition type resin and converting the resin into a regeneration type to swell, a method which comprises combining the above two methods, a method which comprises packing an ion exchanger in demineralizing compartments and compressing compartment frames to reduce a thickness of the demineralizing compartments, thereby reducing their volumes, a method which comprises packing an ion exchanger and a material swellable with water in dry state other than ion exchange resin and swelling with water, and the like.

In any of the above methods, it is preferable to employ an optimized method since troubles such as wrinkles of a membrane, a drift current and the like are caused when the pressure becomes ununiform.

EXAMPLES

Hereinafter, the present invention is further illustrated by Example (Example 3) and Comparative Examples (Example 1 and Example 2), but should not be limited thereto.

Example 1

A sulfonic acid type cation exchange resin (Diaion SK1B: tradename manufactured by Mitsubishi Chemical Corporation) having an average particle size of 620 μm and an ion exchange capacity of 4.2 meq/g dry resin and a quaternary ammonium salt type anion exchange resin (Diaion SA10A: tradename manufactured by Mitsubishi Chemical Corporation) having an average particle size of 540 μm and an ion exchange capacity of 3.7 meq/g dry resin were dried and mixed in a ratio of cation exchange resin/anion exchange resin of 50/50 (volume ratio in dry state) to prepare a mixture having an ion exchange capacity ratio of 60/40.

3 wt % of a linear low density polyethylene (Affinity SM-1300: tradename manufactured by Dow Chemical Company) was mixed with the above prepared mixture, and the mixture was kneaded at 120 to 130° C. The kneaded material thus obtained was heat-formed by a flat plate press at 130° C. to obtain a sheet-like porous ion exchanger having a thickness of 6 mm.

A cation exchange membrane (Selemion CMT: tradename manufactured by Asahi Glass Company Ltd.) and an anion exchange membrane (Selemion AMP: tradename manufactured by Asahi Glass Company Ltd.) were alternately arranged between an anode and a cathode so as to provide 5 pairs of demineralizing compartments compartmentalized with anion exchange membranes on the anode side and compartmentalized with cation exchange membranes on the cathode side and concentrating compartments compartmentalized with cation exchange membranes on the anode side and compartmentalized with anion exchange membranes on the cathode side alternately arranged. An effective area of the above membranes was 1.6 m$^2$. The above prepared sheet-like porous ion exchangers were fixed in the demineralizing compartments where water is supplied to swell the porous ion exchangers to adjust a pressure in a gap to the ion exchange membranes to about 2 kg·cm$^{-2}$.

In such a state, water permeability of the porous ion exchangers was 130 kg·cm$^{-1}$·h$^{-1}$ under a pressure of 0.35 kg·cm . Thereafter, deionization test was carried out by supplying water having an electroconductivity of 7 μS·cm in an amount of 2.8 m$^3$·h$^{-1}$ as a water to be treated, and as a result, a deionized water having an electric resistance of 15.6 MΩ·cm was obtained. Unit cell voltage was 7.3 V.

Example 2

The same cation exchange resin and anion exchange resin as used in Example 1 were respectively dried, and 3 wt % of a linear low density polyethylene (Affinity SM-1300: tradename manufactured by Dow Chemical Company) was mixed with each of the above ion exchange resins, and each mixture was kneaded at 120 to 130° C. Thereafter, each of the kneaded cation exchange resin and the kneaded anion exchange resin was heat-formed by a flat plate press at 130° C. to obtain a sheet-like cation exchanger A having a thickness of 6 mm and a sheet-like anion exchanger B having a thickness of 6 mm. Thereafter, the cation exchanger A and the anion exchanger B were punched, and the punched disk-like cation exchanger A having a diameter of 2 cm was fixed into the punched anion exchanger B in such a manner as illustrated in FIG. 1 to prepare a porous ion exchanger having a dot-like pattern.

Each sheet of the above prepared porous ion exchangers was accommodated in each of the demineralizing compartments of the same electrodialyzer as used in Example 1, and water is supplied thereto to swell the porous ion exchanger, thereby adjusting a pressure in a gap to an ion exchange membrane to about 2 kg·cm$^{-2}$. In such a state, water permeability of the porous ion exchanger was 130 kg·cm$^{-1}$·h$^{-1}$ under a pressure of 0.35 kg·cm$^{-2}$. Thereafter, water having an electroconductivity of 7 μS·cm$^{-1}$ was supplied in an amount of 2.8 m$^3$·h$^{-1}$ as a water to be treated, and an electric current of 40 A·m$^{-2}$ was applied thereto, and as this result, a deionized water having an electric resistance of 17.6 MΩ·cm was obtained. Unit cell voltage was 15.3 V.

Example 3

The same ion exchange resins as used in Example 1 were dried, and the dry cation exchange resin and the dry anion exchange resin were mixed in a weight ratio of 8/2 (cation exchange resin/anion exchange resin), and a sheet-like first porous ion exchanger was prepared in the same manner as in Example 1. Thereafter, an anion exchange resin and a cation exchange resin were mixed in a weight ratio of 8/2 (anion exchange resin/cation exchange resin), and a sheet-like second porous ion exchanger was prepared in the same manner as in Example 1. Thereafter, by using the above prepared two porous ion exchangers, a porous ion exchanger having such a dot-like pattern as shown in FIG. 1 was prepared in the same manner as in Example 2.

Each sheet of the above ion exchangers was accommodated in each demineralizing compartment in the same electrodialyzer as used in Example 1, and water is supplied to swell the above ion exchangers to adjust a pressure in a gap to an ion exchange membrane to about 2 kg·cm$^{-2}$. Water permeability of the ion exchanger was 100 kg·cm$^{-1}$·h$^{-1}$ under a pressure of 0.35 kg·cm$^{-2}$. Thereafter, water having an electroconductivity of 5 μS·cm$^{-1}$ was supplied in an amount of 2.8 m$^3$·h$^{-1}$ as a water to be treated, and an electric current of 40 A·m$^{-2}$ was applied thereto, and as this result, a deionized water having an electric resistance of 17.3 MΩ·cm was obtained. Unit cell voltage was 10.0 V.

According to the apparatus for producing deionized water of the present invention, pure water having a high purity can be stably produced under a low voltage.

What is claimed is:

1. An apparatus for producing deionized water, which comprises an ion exchanger in demineralizing compartments of an electrodialyzer having cation exchange membranes and anion exchange membranes alternately arranged between an anode and a cathode, wherein the ion exchanger is a composite ion exchanger comprising a first porous ion exchanger having a mixture of 60 to 95 wt % of cation exchange resin particles and 5 to 40 wt % of anion exchange resin particles bonded to each other and a second porous ion exchanger having a mixture of 60 to 95 wt % of anion exchange resin particles and 5 to 40 wt % of cation exchange resin particles bonded to each other; and wherein the first porous ion exchanger and the second porous ion exchanger provide a dot-shaped pattern.

2. The apparatus of claim 1, wherein the first porous ion exchanger and the second porous ion exchanger are bonded to each other.

3. The apparatus of claim 1, wherein the composite ion exchanger has a water permeability of at least 1 kg·cm$^{-1}$·h$^{-1}$ under a pressure of 0.35 kg·cm$^{-2}$.

4. The apparatus of claim 3, wherein the composite ion-exchanger has a water permeability of at least 10 kg·cm$^{-1}$·h$^{-1}$ under a pressure of 0.35 kg·cm$^{-2}$.

5. The apparatus of claim 1, wherein the first porous ion exchanger or the second porous ion exchanger comprises ion exchange resin particles bonded with a binder polymer.

6. The apparatus of claim 5, wherein said cation exchange resin particles and said anion exchange resin particles of the first and second porous ion exchangers have an average particle size of from 50 to 2,000 µm.

7. The apparatus of claim 6, wherein the ion exchange resin particles have an average particle size of from 300 to 1,000 µm.

8. The apparatus of claim 5, wherein the first and second porous ion-exchangers comprise ion exchange particles having a shape selected from the group consisting of oval-shaped, plate-shaped, disk-shaped, rod-shaped and spherical-shaped.

9. The apparatus of claim 1, wherein said cation exchange resin particles and said anion exchange resin particles of the first and second porous ion-exchangers have an ion exchange capacity of from 0.5 to 7.0 meq/g dry resin.

10. The apparatus of claim 9, wherein said cation exchange resin particles and said anion exchange resin particles of the first and second porous ion-exchangers have an ion exchange capacity of from 1.0 to 5.0 meq/g dry resin.

* * * * *